(12) United States Patent
Ni et al.

(10) Patent No.: US 11,629,992 B2
(45) Date of Patent: Apr. 18, 2023

(54) SUPPORT DEVICE USED IN WEIGHING COAL OF RAW COAL BUNKER IN THERMAL POWER PLANT AND WEIGHABLE RAW COAL BUNKER

(71) Applicant: HUANENG POWER INTERNATIONAL, INC. SHANGHAI SHIDONGKOU FIRST POWER PLANT, Shanghai (CN)

(72) Inventors: Zhong Ni, Shanghai (CN); Zhiwei Sang, Shanghai (CN); Zhongming Huang, Shanghai (CN); Xin Hu, Shanghai (CN); Pengxia Ni, Shanghai (CN); Ping Zhu, Shanghai (CN); Qinghan Zheng, Shanghai (CN); Runhan Liu, Shanghai (CN); Xiao Zhang, Shanghai (CN); Jinxin Yu, Shanghai (CN); Haifeng Guan, Shanghai (CN); Jialei Deng, Shanghai (CN)

(73) Assignees: HUANENG POWER INTERNATIONAL, INC., Shanghai (CN); SHANGHAI SHIDONGKOU FIRST POWER PLANT, Shanghai (CN)

(*) Notice: Subject to any disclaimer, the term of this patent is extended or adjusted under 35 U.S.C. 154(b) by 190 days.

(21) Appl. No.: 17/319,047

(22) Filed: May 12, 2021

(65) Prior Publication Data
US 2022/0316940 A1 Oct. 6, 2022

(30) Foreign Application Priority Data
Mar. 31, 2021 (CN) .......................... 202110347541.1

(51) Int. Cl.
*G01G 19/00* (2006.01)
*G01G 21/23* (2006.01)
*G01G 21/28* (2006.01)

(52) U.S. Cl.
CPC .............. *G01G 21/23* (2013.01); *G01G 19/00* (2013.01); *G01G 21/28* (2013.01)

(58) Field of Classification Search
CPC .......... G01G 19/00; G01G 21/23; G01G 21/28
See application file for complete search history.

(56) References Cited

U.S. PATENT DOCUMENTS 3,915,248 A * 10/1975 Paelian ...................... G01L 1/26
177/DIG. 9
4,044,920 A * 8/1977 Swartzendruber ..... G01G 13/16
73/862.622

(Continued)

*Primary Examiner* — Randy W Gibson
(74) *Attorney, Agent, or Firm* — Winston Hsu (57) ABSTRACT

The present invention relates to a support device used in weighing coal of a raw coal bunker in a thermal power plant and a weighable raw coal bunker. The support device includes a base, a positioning sleeve, an upper support and a weighing sensor, a sensor groove being provided in the middle of the base, the weighing sensor being arranged in the sensor groove, the positioning sleeve being arranged on the base in a covering mode, a positioning hole being provided in the middle of the positioning sleeve, the upper support being movably inserted in the positioning hole, and a bottom surface of the upper support penetrating the positioning hole to abut against a top surface of the weighing sensor. The raw coal bunker uses the support device. Compared with the prior art, the present invention effectively meets the weighing requirement of the raw coal bunker.

9 Claims, 6 Drawing Sheets

(56) References Cited

U.S. PATENT DOCUMENTS

| 6,433,289 B1 * | 8/2002 | Gurr | G01G 21/06 |
| | | | 177/DIG. 9 |
| 7,214,893 B2 * | 5/2007 | Sikula | G01G 21/23 |
| | | | 177/DIG. 9 |

* cited by examiner

SUPPORT DEVICE USED IN WEIGHING COAL OF RAW COAL BUNKER IN THERMAL POWER PLANT AND WEIGHABLE RAW COAL BUNKER

BACKGROUND OF THE INVENTION

1. Field of the Invention

The present invention relates to the field of raw coal bunker weighing, and in particular to a support device used in weighing coal of a raw coal bunker in a thermal power plant and a weighable raw coal bunker.

2. Description of the Prior Art

A raw coal bunker is a coal storage device which is arranged to guarantee the stability of power generation engineering coal in a thermal power generation enterprise, and is special for storing primarily-crushed coal (partical size ≤30 mm), the coal output from the raw coal bunker enters a powder manufacturing apparatus system through a coal feeder, to make the coal finally meet the combustion-based power generation requirement, and therefore, the raw coal bunker is a necessary apparatus in a coal thermal power generation system.

The quantity of the coal stored in the raw coal bunker is mainly measured by measuring the stack height of the coal in the raw coal bunker to indirect determine the mass of the coal in the bunker, so as to control coal to be conveyed to the raw coal bunker, if the quantity of the raw coal bunker is lower than a set value, it is required to supplement the bunker with coal, and if the coal in the raw coal bunker has reached a high position, that is, a state in which the bunker is full, it is required to stop inputting the coal, so as to prevent the coal from overflowing; in general, a thermal power generation apparatus set is configured with several raw coal bunkers, the output power quantity of a power generation unit will be directly influenced if there is an empty raw coal bunker, and therefore, how to guarantee that coal in these raw coal bunkers is all in a rational quantity requires that the quantity of coal stored in each raw coal bunker is accurately aware, and the coal is conveyed into the bunker in time, thereby avoiding the phenomenon of an empty bunker; in addition, the quantity of the coal delivered from the bunker can also be controlled by accurately measuring the mass of the coal in the raw coal bunker, so as to precisely blend the coal for blending combustion, to increase the economic benefit of thermal power generation; and therefore, it is very important to accurately measure the mass of the coal in the raw coal bunker.

At present, a method for measuring the quantity of the coal in the raw coal bunker is mainly to measure the stack height of the coal in the bunker to indirectly measure the mass of the coal, and mainly uses an ultrasonic meter and a millimeter wave coal position radar arranged on the top of the raw coal bunker to measure the distance between a surface of the coal and the meter, but in actual use, a large quantity of flying dust will be caused when the coal is conveyed in the bunker, and therefore, an area with no coal stacked in the bunker is full of coal dust, a concentration of the coal dust is extremely high, in addition, much water vapor will be generated by the coal with a high water content, and a mixture of the coal dust and the water vapor greatly influences an ultrasonic wave and a radar wave, which makes these measurement devices cannot effectively measure the stack height of the coal in the bunker, and the quantity of the coal in the bunker cannot be reflected; and in addition, in the stacking process, the coal in the bunker is not horizontally and uniformly distributed on one horizontal plane, a surface of a coal stack will be formed into a wave shape, but the measurement device can only measure the height of one point position on the surface of the coal stack, and it is obvious that the real quantity of the coal in the bunker cannot be accurately reflected in such a way based on one or several point positions, which is an inherent defect of the measurement method of this kind.

The quantity of the coal in the bunker can be directly determined by directly measuring the weight of the raw coal bunker, at present, many raw coal bunkers of the thermal power generation enterprises in China have used a weighing mode, however, how to arrange a weighing sensor is a problem all the time, during a normal operation, the weight of one raw coal bunker plus the coal in the bunker may be up to 500 tons-600 tons, in order to guarantee the stable and safe arrangement of the raw coal bunker, it is required to fixedly install a support frame of the raw coal bunker on a corresponding civil foundation, however, in order to meet the weighing requirement of the weighing sensor, it is also required to make the entire raw coal bunker be in a floating state, thereby guaranteeing the measurement precision, which causes a pair of conflicts, Owing to this reason, at present, although a raw coal bunker with a function of being weighable is newly built, it is mainly to use a method in which a hinge fulcrum is additionally installed on a single side and the weighing sensor is directly supported on the other side, according to this method, by measuring the weight on one side to indirectly feed back the weight of the coal in the entire raw coal bunker, since the coal in the bunker is stacked and distributed unevenly, the measurement precision is low and it is difficult to meet the requirement of precise measurement in actual production, in addition, for some raw coal bunkers with a plurality of support points, for example, the raw coal bunker with eight support points, it is difficult to coaxially arrange the positions of hinge fulcrums, the raw coal bunker is not suitable for the method of the hinge fulcrum, and it is very difficult to arrange the weighing sensor for a coal bunker fixing structure of this kind. Only if large modifications are made to a support structure of the raw coal bunker and a civil support foundation seat, the installation requirement of the sensor can be met, which will obviously increase an investment cost greatly.

SUMMARY OF THE INVENTION

Aiming at overcoming the above-mentioned defect in the prior art, the present invention provides a support device used in weighing coal of a raw coal bunker in a thermal power plant and a weighable raw coal bunker.

The objective of the present invention may be implemented through the following technical solution:

a support device used in weighing coal of a raw coal bunker in a thermal power plant includes a base, a positioning sleeve, an upper support and a weighing sensor, a sensor groove being provided in the middle of the base, the weighing sensor being arranged in the sensor groove, the positioning sleeve being fixedly installed on the base, a positioning hole being provided in the middle of the positioning sleeve, the upper support being movably inserted in the positioning hole, and a bottom surface of the upper support penetrating the positioning hole to abut against a top surface of the weighing sensor.

Preferably, the upper support includes an upper plane, a support raised shoulder, a positioning column and a stressed shaft end from up to down, the positioning column and the stressed shaft end being movably inserted in the positioning hole, and a bottom surface of the stressed shaft end abutting against the top surface of the weighing sensor.

Preferably, the support device further includes a limiting baffle, the limiting baffle fixedly sleeving a peripheral side of the stressed shaft end, and a top surface of the limiting baffle being arranged spaced from a bottom surface of the positioning sleeve.

Preferably, a bottom surface of the positioning column is provided with a fixing screw hole, and the limiting baffle fixedly sleeves the peripheral side of the stressed shaft end through a fixing bolt and the fixing screw hole.

Preferably, the base includes a base support column, a ring flange, a bottom plate and a middle support platform, a bottom surface of the base support column being fixedly connected to the bottom plate, a top surface of the base support column being fixedly connected to the ring flange, the middle of the base support column being fixedly provided with the middle support platform, the sensor groove being formed between the middle support platform and an upper cavity of the base support column, and a lifting chamber being formed between the middle support platform and a lower cavity of the base support column.

Preferably, the support device further includes a jacking plate, the jacking plate including a jacking plate plane and a jacking plate column, the middle of the middle support platform being provided with a lifting hole, and the jacking plate column being movably inserted in the lifting hole.

Preferably, one side of the sensor groove is provided with an auxiliary taking-out hole, and the other side thereof is provided with a sensor window.

Preferably, the base further includes a plurality of reinforcing ribs, the bottom of the reinforcing rib being fixedly connected to the bottom plate, and a side surface of the reinforcing rib being fixedly connected to a peripheral side of the base support column.

Preferably, the positioning sleeve includes a positioning sleeve main body, an upper end plate, a connection flange and a horizontal positioning raised shoulder, the upper end plate being arranged on the top of the positioning sleeve main body, the connection flange sleeving a peripheral side of the positioning sleeve main body, the horizontal positioning raised shoulder being arranged on a bottom surface of the positioning sleeve main body, the positioning hole being provided in the middle of the positioning sleeve main body, the connection flange being fixedly connected to the ring flange, the ring flange being fixedly connected to the connection flange through the connection bolt, and a peripheral side of the positioning hole being provided with a lining.

A weighable raw coal bunker includes a raw coal bunker, a civil foundation ring beam and the above-mentioned support device used in weighing the coal of the raw coal bunker in the thermal power plant, a peripheral side of the raw coal bunker being provided with a plurality of support frames, the top of the support device used in weighing the coal of the raw coal bunker in the thermal power plant being fixedly connected to the bottom of the support frame, and the bottom of the support device used in weighing the coal of the raw coal bunker in the thermal power plant being fixedly connected to the civil foundation ring beam.

Compared with the prior art, the advantages of the present invention are as follows:

1. the support device used in weighing the coal of the raw coal bunker in the thermal power plant of the present invention can effectively meet the weighing requirement of the raw coal bunker, has a simple structure, is safe, reliable and convenient to install, can meet the weighing requirement of the raw coal bunker, can also guarantee that the raw coal bunker is fixed firmly and operates safely, and meanwhile has a function of facilitating maintenance and replacement of the weighing sensor;

2. the present invention uses structures of the positioning sleeve, the upper support, the base and the weighing sensor to match a stress, a weight of the raw coal bunker can be effectively and precisely measured, the weight of the entire raw coal bunker is measured by arranging a plurality of support devices, a weight error caused by measuring a few of point positions only is prevented, the requirement of precisely measuring coal in the raw coal bunker can be met, not only can a weight of the coal be accurately measured, the coal can be automatically and precisely blended for blending combustion, thereby increasing an economic benefit of a power generation enterprise;

3. the support device of the present invention has small displacement in a vertical direction, resolves a conflict between floating and stability during weighing, can limit displacement of the raw coal bunker in a horizontal direction, and can completely guarantee operation safety of the raw coal bunker;

4. the support device of the present invention is suitable for raw coal bunkers in various forms, the device has a small boundary dimension and an easy arrangement and installation on site, if it is required to transform some old raw coal bunkers into raw coal bunkers with a function of being weighable, the support device may be used for a transformation, installation and maintenance are facilitated, and a cost for replacing an apparatus is reduced; and 5. the present invention utilises cooperation between the jacking plate and the lifting chamber to realise a function of taking out and putting in the weighing sensor safely and reliably, can facilitate calibration, detection and replacement on the weighing sensor, and reduces a maintenance cost.

These and other objectives of the present invention will no doubt become obvious to those of ordinary skill in the art after reading the following detailed description of the preferred embodiment that is illustrated in the various figures and drawings.

DETAILED DESCRIPTION

The present invention will be described in detail below with reference to accompanying drawings and particular embodiments. It should be noted that the following descriptions of the implementation are merely substantially exemplary, the present invention is not intended to limit its applicable matter and use, and the present invention is not limited to the following implementation.

Embodiments

Figure 1:
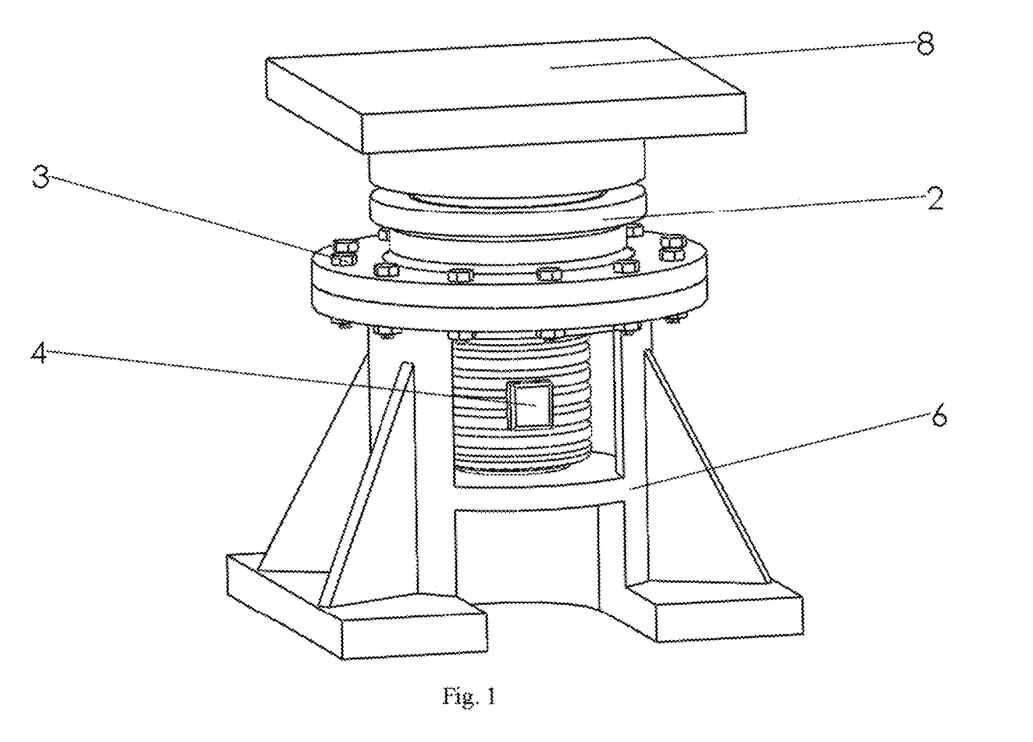
FIG. 1 is a structural schematic diagram of the present invention as a whole.
Figure 2:
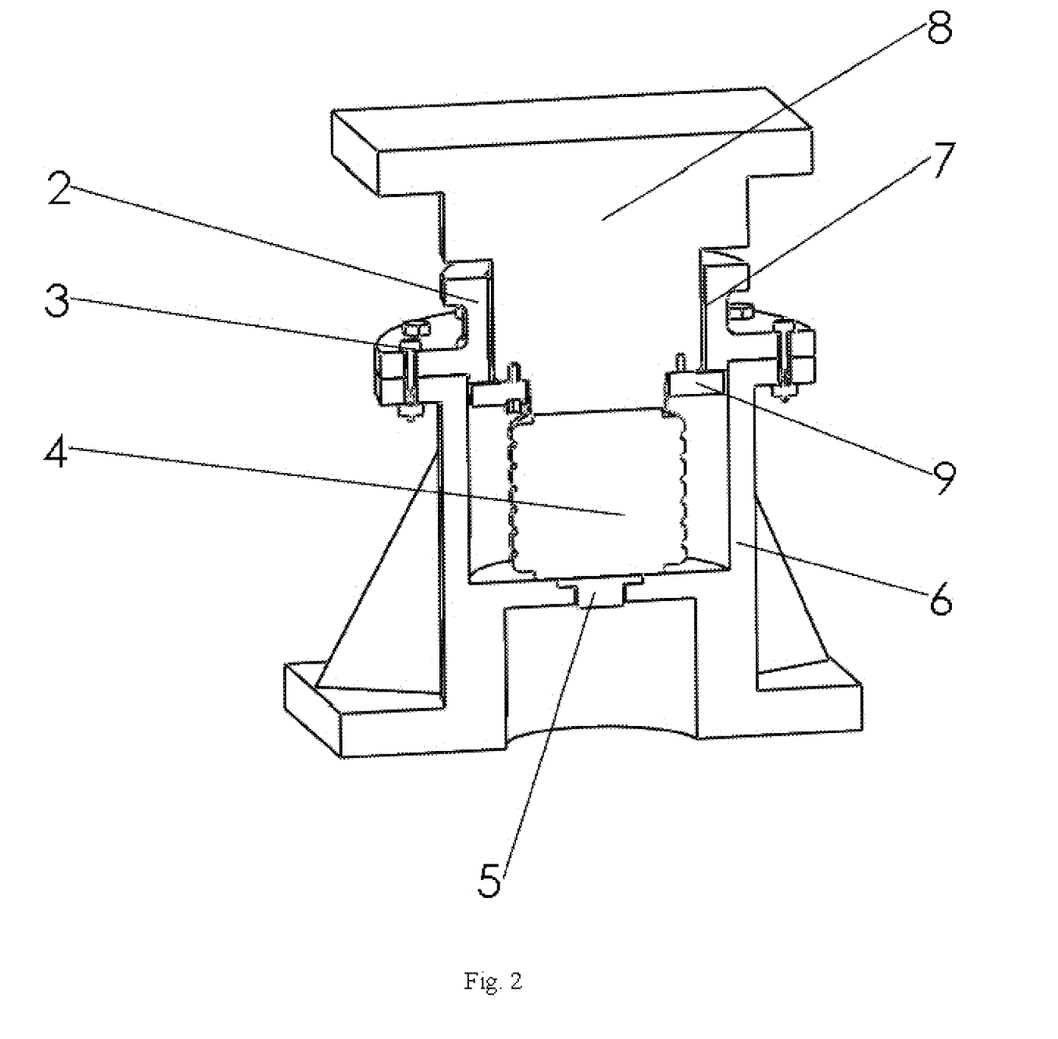
FIG. 2 is a sectional view of the present invention.

A support device used in weighing coal of a raw coal bunker in a thermal power plant, as shown in FIGS. 1 and 2, includes a base 6, a positioning sleeve 2, an upper support 8 and a weighing sensor 4, a sensor groove 6-9 being provided in the middle of the base 6, the weighing sensor 4 being arranged in the sensor groove 6-9, the positioning sleeve 2 being fixedly installed on the base 6, a positioning hole 2-3 being provided in the middle of the positioning sleeve 2, the upper support 8 being movably inserted in the positioning hole 2-3, and a bottom surface of the upper support 8 penetrating the positioning hole 2-3 to abut against a top surface of the weighing sensor 4.

Figure 4:
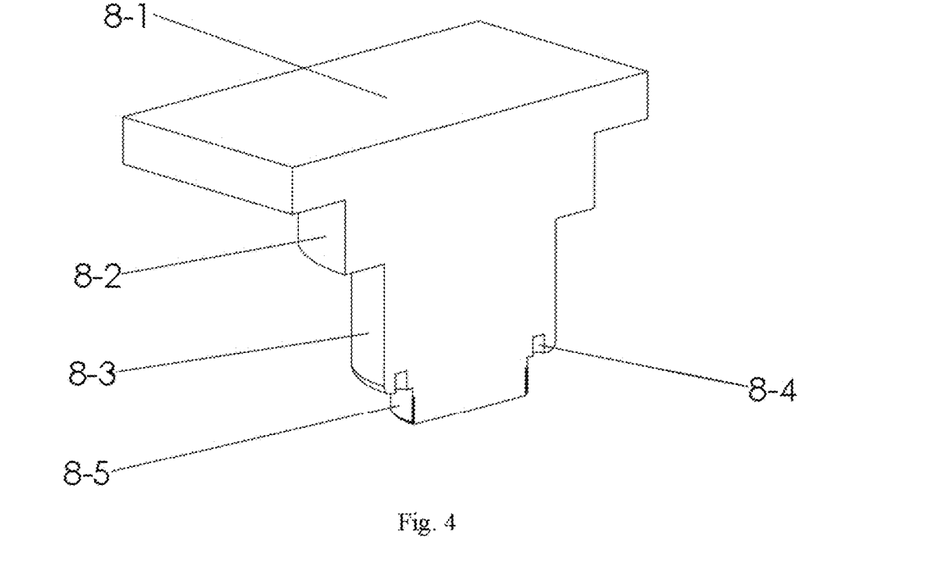
FIG. 4 is a structural sectional view of an upper support of the present invention.

Particularly, as shown in FIG. 4, the upper support 8 includes an upper plane 8-1, a support raised shoulder 8-2, a positioning column 8-3 and a stressed shaft end 8-5 from up to down, the positioning column 8-3 and the stressed shaft end 8-5 being movably inserted in the positioning hole 2-3, and a bottom surface of the stressed shaft end 8-5 abutting against the top surface of the weighing sensor 4.

Figure 5:
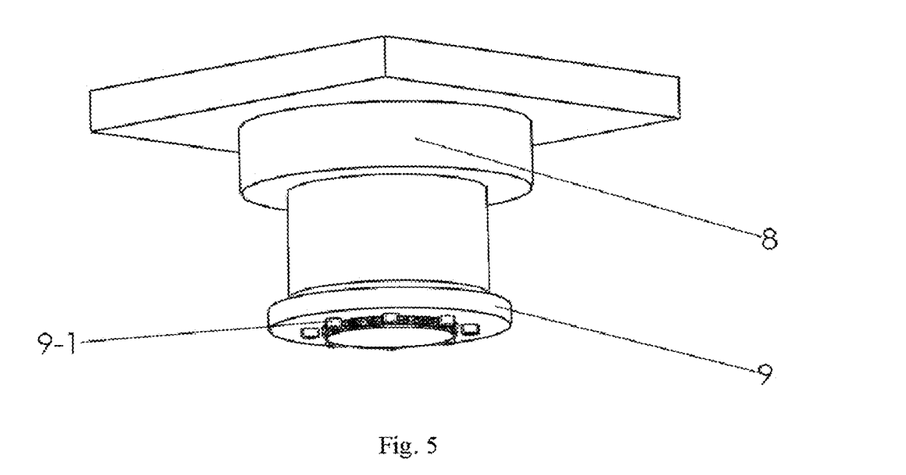
FIG. 5 is a diagram of the present invention with the upper support and a limiting baffle assembled.

Further, as shown in FIG. 5, in order to limit a movement range of the upper support 8, the support device further includes a limiting baffle 9, the limiting baffle 9 fixedly sleeving a peripheral side of the stressed shaft end 8-5, a top surface of the limiting baffle 9 being arranged spaced from a bottom surface of the positioning sleeve 2, in addition, the limiting baffle 9 being connected to the upper support 8 in such a way that a bottom surface of the positioning column 8-3 is provided with a fixing screw hole 8-4, and the limiting baffle 9 fixedly sleeving the peripheral side of the stressed shaft end 8-5 through a fixing bolt 9-1 and the fixing screw hole 8-4.

Figure 3:
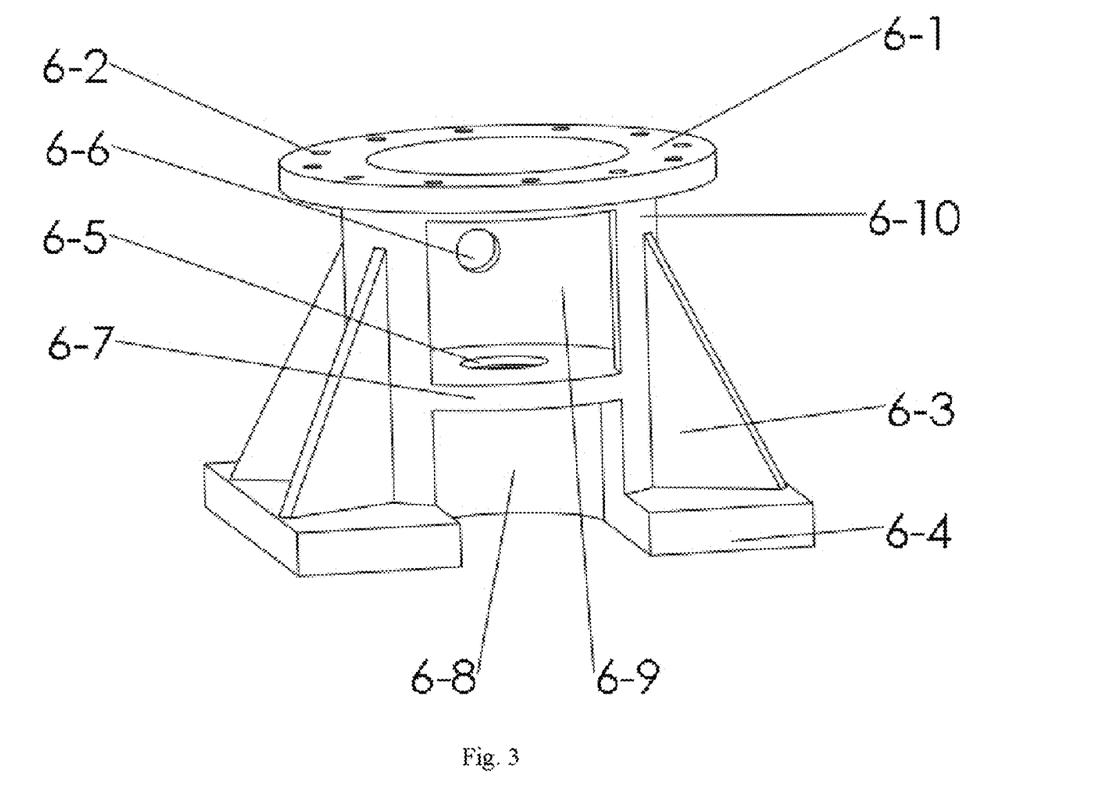
FIG. 3 is a structural schematic diagram of a base of the present invention.

In the present embodiment, as shown in FIG. 3, the base 6 includes a base support column 6-10, a ring flange 6-1, a bottom plate 6-4 and a middle support platform 6-7, a bottom surface of the base support column 6-10 being fixedly connected to the bottom plate 6-4, a top surface of the base support column 6-10 being fixedly connected to the ring flange 6-1, the middle of the base support column 6-10 being fixedly provided with the middle support platform 6-7, the sensor groove 6-9 being formed between the middle support platform 6-7 and an upper cavity of the base support column 6-10, and a lifting chamber 6-8 being formed between the middle support platform 6-7 and a lower cavity of the base support column 6-10.

Figure 7:
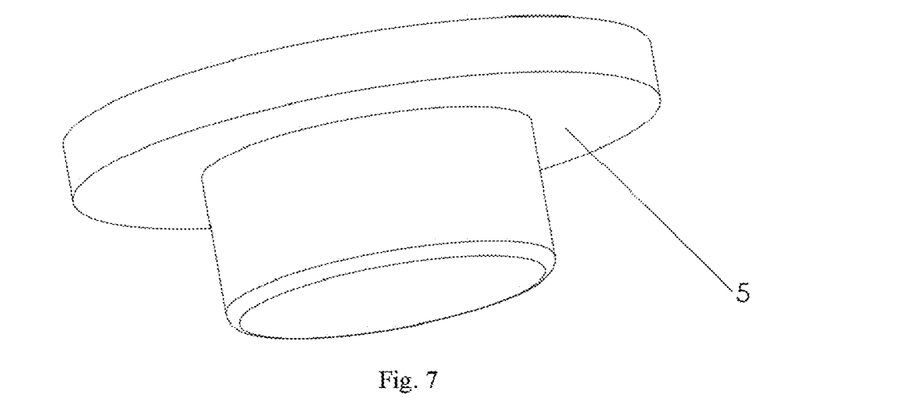
FIG. 7 is a structural schematic diagram of a jacking plate of the present invention.
Figure 8:
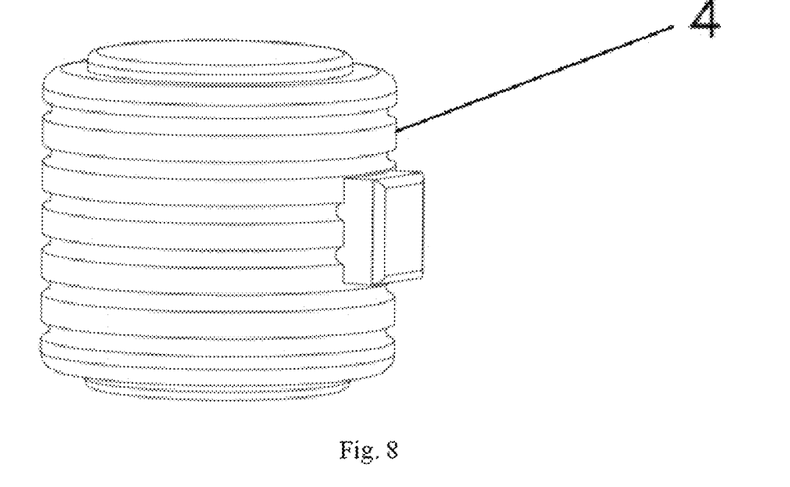
FIG. 8 is a structural schematic diagram of a weighing sensor of the present invention.

In order to make it convenient to lift the weighing sensor 4 for replacement, maintenance, etc., as shown in FIG. 7, the support device further includes a jacking plate 5, the jacking plate 5 including a jacking plate plane and a jacking plate column, the middle of the middle support platform 6-7 being provided with a lifting hole 6-5, and the jacking plate column being movably inserted in the lifting hole 6-5. In addition, one side of the sensor groove 6-9 is provided with an auxiliary taking-out hole 6-6, and the other side thereof is provided with a sensor window.

In order to reinforce strength of the base 6, the base 6 further includes a plurality of reinforcing ribs 6-3, the bottom of the reinforcing rib 6-3 being fixedly connected to the bottom plate 6-4, and a side surface of the reinforcing rib 6-3 being fixedly connected to a peripheral side of the base support column 6-10.

Figure 6:
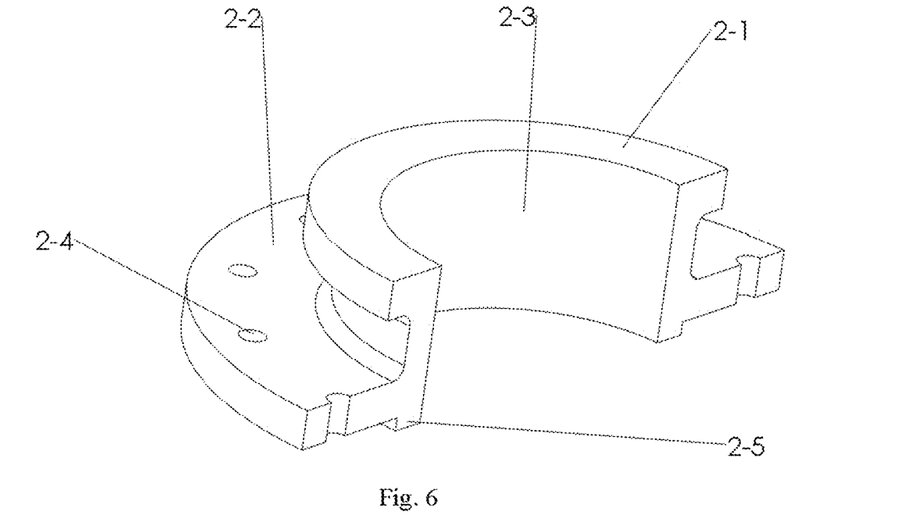
FIG. 6 is a sectional view of a positioning sleeve of the present invention.

As shown in FIG. 6, the positioning sleeve 2 includes a positioning sleeve main body, an upper end plate 2-1, a connection flange 2-2 and a horizontal positioning raised shoulder 2-5, the upper end plate 2-1 being arranged on the top of the positioning sleeve main body, the connection flange 2-2 sleeving a peripheral side of the positioning sleeve main body, the horizontal positioning raised shoulder 2-5 being arranged on a bottom surface of the connection flange 2-2, the middle of the positioning sleeve main body being provided with the positioning hole 2-3, the connection flange being fixedly connected to the ring flange, the ring flange 6-1 being provided with a flange screw hole 6-2, and when the positioning sleeve 2 is fixedly connected to the base 6, the ring flange 6-1 being indirectly and fixedly connected to the connection flange 2-2 through a connection bolt 3.

The peripheral side of the positioning hole 2-3 is provided with a lining 7, the lining 7 having stable performance, abrasive resistance and a small friction coefficient, being provided with a material with enough strength, and facilitating a movement of the upper support 8 in the positioning hole 2-3.

Figure 9:
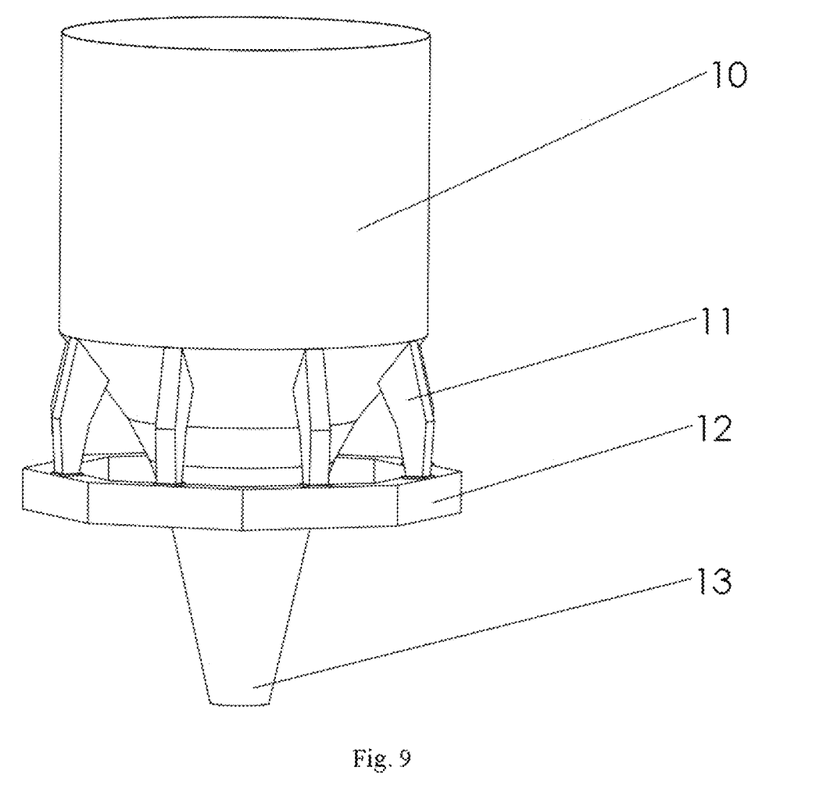
FIG. 9 is a structural schematic diagram of an existing raw coal bunker.
Figure 10:
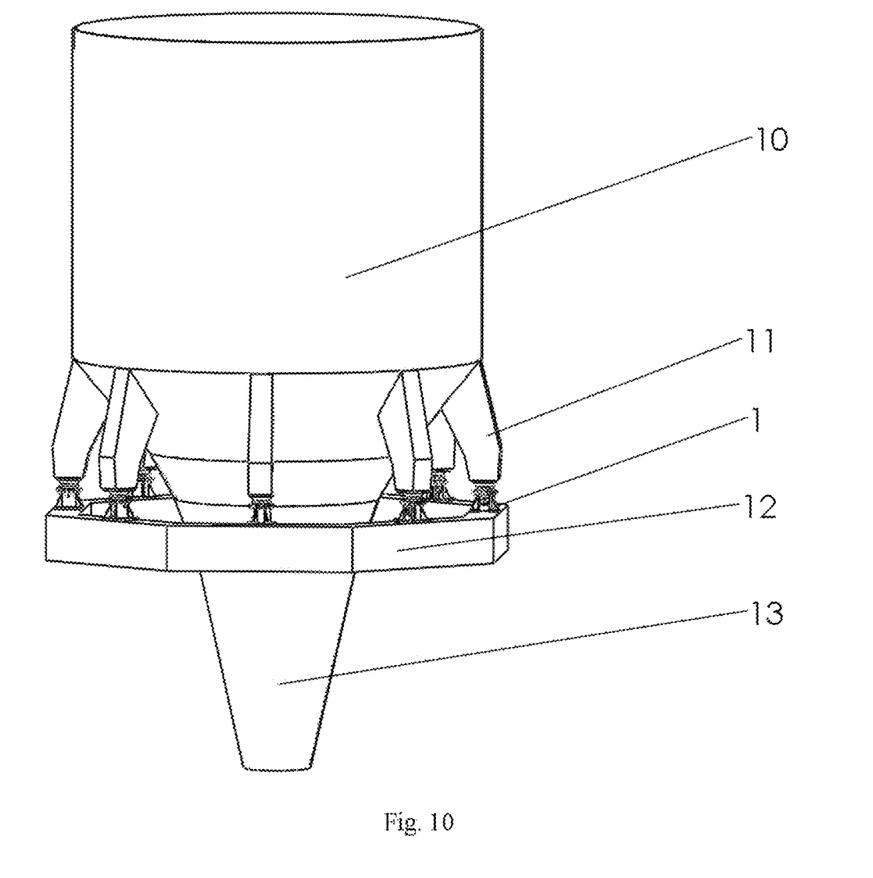
FIG. 10 is a structural schematic diagram of a raw coal bunker with the present invention installed.

An existing raw coal bunker is as shown in FIG. 9, a weighable raw coal bunker of the present invention, as shown in FIG. 10, includes a raw coal bunker 10, a civil foundation ring beam 12 and a support device 1, the support device 1 being the above-mentioned support device used in weighing the coal of the raw coal bunker in the thermal power plant, a peripheral side of the raw coal bunker 10 being provided with a plurality of support frames 11, the top of the support device used in weighing the coal of the raw coal bunker in the thermal power plant being fixedly connected to the bottom of the support frame 11, the bottom of the support device used in weighing the coal of the raw coal bunker in the thermal power plant being fixedly connected to the civil foundation ring beam 12, and the bottom of the raw coal bunker 10 being provided with a coal outlet 13.

Based on a structure of the present invention, when the support device is used for the weighable raw coal bunker, the upper plane of the weighing sensor 4 abuts against the bottom surface of the upper support 8, a weight of the raw coal bunker 10 is transmitted to the weighing sensor 4 through the upper support 8, the weighing sensor 4 is placed on the middle support platform 6-7 of the base 6, a bottom surface of the weighing sensor 4 is in plane contact with the middle support platform 6-7, and the weight of the raw coal bunker 10 is transmitted to the civil foundation ring beam 12.

In addition, a structure of the positioning sleeve 2 of the present invention can limit a horizontal plane of the positioning column 8-3 of the upper support 8, so as to be perpendicular to a central axis of the positioning column, and the positioning column 8-3 can only move up and down in a vertical direction in the positioning sleeve, that is, along a connection line of centers of circles of upper and lower end surfaces or the central axis of the positioning column 8-3, or a central axis of the positioning sleeve. Through a structure of the support raised shoulder 8-2, a downward movement of the positioning column 8-3 can be limited, a structure of the limiting baffle 9 may limit an upward movement of the positioning column 8-3, the positioning column 8-3 can only move up and down in one region through these two limitations, and a specific limiting relation is as follows: the upper end plate 2-1 of the positioning sleeve 2 keeps a certain distance from an end surface of the support raised shoulder 8-2 of the upper support 8, moreover, a lower end surface of the horizontal positioning raised shoulder 2-5 of the positioning sleeve 2 keeps a certain distance from the stressed shaft end 8-5 fixed on the upper support 8, at the moment, the upper support 8 is in a state of being movable up and down, but the sum of the two distances should be less than 5 mm.

After an entire device set is installed, under a normal condition, the upper support 8 integrated with the positioning column 8-3 moves downwards all the time till it makes contact with an upper end surface of the weighing sensor 4 under action of gravity of the raw coal bunker 10, is tightly pressed against the weighing sensor 4 and transmits the gravity of the raw coal bunker 10 to the weighing sensor 4, pressure is converted into an electrical signal for outputting through the weighing sensor 4, the output electrical signal can meet the requirement of a signal acquisition input of an entire system set, the weighing sensor 4 transmits the pressure of the raw coal bunker 10 to the middle support platform 6-7 of the base 6, the gravity of the raw coal bunker 10 is transmitted to the civil foundation ring beam 12 through the base 6, and therefore, the entire device set plays a role of not only arranging and exerting the weighing sensor 4, but also supporting the raw coal bunker 10.

In addition, when the weighing sensor 4 needs to be calibrated after being used for a period of time, the calibration is to use a standard metering device to detect accuracy of the weighing sensor 4, so as to determine whether or not it conforms to a criterion, or since the weighing sensor is damaged and needs to be replaced, it is required to take out and put in the weighing sensor 4, and the present device has a function of taking out and putting in the weighing sensor safely and reliably:

when it is required to replace the weighing sensor 4, a jack is put in the lifting chamber 6-8, a jacking rod of the jack rises to lift up the jacking plate 5, and then drives the entire weighing sensor 4 to move upwards, at the same time, the weighing sensor 4 drives the upper support 8 to move upwards till the limiting baffle 9 makes contact with the end surface of the horizontal positioning raised shoulder 2-5 of the positioning sleeve 2, the jacking rod of the jack stops rising, at the moment, the distance between the end surface of the support raised shoulder 8-2 of the upper support 8 and the upper end plate 2-1 of the positioning sleeve 2 has become larger, a metal block for temporary maintenance with a thickness same as the distance may be used to be inserted therein, then jacking rod of the jack retracts downwards, at the moment, gravity, acting on the upper support 8, of the raw coal bunker 10 will be directly transmitted to the upper end plate 2-1 of the positioning sleeve 2 through the metal block and then is transmitted to the base 6 and the civil foundation ring beam 12, the weighing sensor 4 has been completely unstressed, the upper end plate 2-1 has been apart from the upper support 8, and therefore, it is easy to take out the weighing sensor from the sensor window on a side surface of the base; and the weighing sensor 4 can be directly put in when needed, then the jack lifts up the jacking plate 5 and the weighing sensor 4 till the weighing sensor makes contact with a lower end surface of the upper support 8, the distance between the end surface of the support raised shoulder 8-2 and the upper endplate 2-1 of the positioning sleeve 2 becomes larger, to make the inserted metal block unstressed, to take out the metal block easily, at the moment, the gravity of the raw coal bunker 10 has directly acted on the weighing sensor 4, when the jacking rod of the jack retracts downwards, under action of the gravity, the upper support 8 moves downwards to drive the weighing sensor 4 and the jacking plate 5 to move downwards till the weighing sensor falls into a central hole 6-5 of the jacking plate 5, meanwhile, a lower end surface of the weighing sensor 4 makes contact with the middle support platform 6-7, a weight borne by the support frame 11 is completely transmitted to the middle support platform 6-7 of the base 6, the jack continues retracting and is unstressed, at the moment, the jack is taken out, and the weighing sensor 4 is replaced through such a process. The metal blocks for the temporary maintenance are various rings or base plates made from a metal material, which have enough strength, can bear the gravity, at this position, of the support frame 11 of the raw coal bunker 10 without deformation, and has a thickness meeting the requirement of replacing the weighing sensor 4, and are only used for the temporary maintenance.

By positioning the upper support by the positioning sleeve 2, the support frame 11 of the raw coal bunker is limited to moving up and down only in a vertical direction within a certain range, in the present embodiment, the range is less than 5 mm, in this way, the normal measurement requirement of the weighing sensor 4 can be met through the support device, the fixing requirement that the raw coal bunker is not allowed to have any displacement on the civil foundation ring beam 12 in a horizontal direction can also be met, and although the support frame moves up and down, a movement is controlled within a very small range, which can completely guarantee operation safety of raw coal bunker 10.

The above-mentioned implementations are merely exemplary and are not intended to limit the scope of the present invention. These implementations can also be carried out in various other ways, and various omissions, substitutions, and changes can be made without departing from the scope of the technical idea of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A support device used in weighing coal of a raw coal bunker in a thermal power plant, characterized in that, it comprises a base, a positioning sleeve, an upper support and a weighing sensor, a sensor groove being provided in the middle of the base, the weighing sensor being arranged in the sensor groove, the positioning sleeve being fixedly installed on the base, a positioning hole being provided in the middle of the positioning sleeve, the upper support being movably inserted in the positioning hole, the upper support comprising an upper plane, a support raised shoulder, a positioning column and a stressed shaft end from up to down, the positioning column and the stressed shaft end being movably inserted in the positioning hole, and a bottom surface of the stressed shaft end abutting against a top surface of the weighing sensor.

2. The support device used in weighing the coal of the raw coal bunker in the thermal power plant according to claim 1, characterized in that, the support device further comprises a limiting baffle, the limiting baffle fixedly sleeving a peripheral side of the stressed shaft end, and a top surface of the limiting baffle being arranged spaced from a bottom surface of the positioning sleeve.

3. The support device used in weighing the coal of the raw coal bunker in the thermal power plant according to claim 2, characterized in that, a bottom surface of the positioning column is provided with a fixing screw hole, and the limiting baffle fixedly sleeves the peripheral side of the stressed shaft end through a fixing bolt and the fixing screw hole.

4. The support device used in weighing the coal of the raw coal bunker in the thermal power plant according to claim 1, characterized in that, the base comprises a base support column, a ring flange, a bottom plate and a middle support platform, a bottom surface of the base support column being fixedly connected to the bottom plate, a top surface of the base support column being fixedly connected to the ring flange, the middle of the base support column being fixedly provided with the middle support platform, the sensor groove being formed between the middle support platform and an upper cavity of the base support column, and a lifting chamber being formed between the middle support platform and a lower cavity of the base support column.

5. The support device used in weighing the coal of the raw coal bunker in the thermal power plant according to claim 4, characterized in that, the support device further comprises a jacking plate, the jacking plate comprising a jacking plate plane and a jacking plate column, the middle of the middle support platform being provided with a lifting hole, and the jacking plate column being movably inserted in the lifting hole.

6. The support device used in weighing the coal of the raw coal bunker in the thermal power plant according to claim 4, characterized in that, one side of the sensor groove is provided with an auxiliary taking-out hole, and the other side thereof is provided with a sensor window.

7. The support device used in weighing the coal of the raw coal bunker in the thermal power plant according to claim 4, characterized in that, the base further comprises a plurality of reinforcing ribs, the bottom of the reinforcing rib being fixedly connected to the bottom plate, and a side surface of the reinforcing rib being fixedly connected to a peripheral side of the base support column.

8. The support device used in weighing the coal of the raw coal bunker in the thermal power plant according to claim 4, characterized in that, the positioning sleeve comprises a positioning sleeve main body, an upper end plate, a connection flange and a horizontal positioning raised shoulder, the upper end plate being arranged on the top of the positioning sleeve main body, the connection flange sleeving a peripheral side of the positioning sleeve main body, the horizontal positioning raised shoulder being arranged on a bottom surface of the positioning sleeve main body, the positioning hole being provided in the middle of the positioning sleeve main body, and the connection flange being fixedly connected to the ring flange.

9. A weighable raw coal bunker, characterized in that, it comprises a raw coal bunker, a civil foundation ring beam and the plurality of support devices used in weighing the coal of the raw coal bunker in the thermal power plant of claim 1, a peripheral side of the raw coal bunker being provided with a plurality of support frames, the top of the support device used in weighing the coal of the raw coal bunker in the thermal power plant being fixedly connected to the bottom of the support frame, and the bottom of the support device used in weighing the coal of the raw coal bunker in the thermal power plant being fixedly connected to the civil foundation ring beam.

\* \* \* \* \*

UNITED STATES PATENT AND TRADEMARK OFFICE
CERTIFICATE OF CORRECTION

PATENT NO. : 11,629,992 B2
APPLICATION NO. : 17/319047
DATED : April 18, 2023
INVENTOR(S) : Zhong Ni et al.

Page 1 of 1

It is certified that error appears in the above-identified patent and that said Letters Patent is hereby corrected as shown below:

On the Title Page

Item (73), correct the information of the assignee from "HUANENG POWER INTERNATIONAL, INC., Shanghai (CN); SHANGHAI SHIDONGKOU FIRST POWER PLANT, Shanghai (CN)" to --HUANENG POWER INTERNATIONAL, INC. SHANGHAI SHIDONGKOU FIRST POWER PLANT, Shanghai (CN)--

Signed and Sealed this
Twenty-seventh Day of June, 2023

Katherine Kelly Vidal
*Director of the United States Patent and Trademark Office*